Patented Apr. 17, 1934

1,955,068

UNITED STATES PATENT OFFICE 1,955,068

PRODUCTION OF ARTIFICIAL MASSES FROM POLYMERIZED VINYL ALCOHOLS AND ALIPHATIC ALDEHYDES AND PRODUCTS OBTAINABLE THEREBY

Heinrich Hopff, Ludwigshafen-on-the-Rhine, and Erich Kuehn, Mannheim, Germany, assignors to I. G. Farbenindustrie Aktiengesellschaft, Frankfort-on-the-Main, Germany No Drawing. Application May 29, 1930, Serial No. 457,502. In Germany June 7, 1929

6 Claims. (Cl. 260—2)

The present invention relates to the production of artificial masses.

We have found that very valuable artificial masses are obtained by treating polymerized vinyl alcohols, i. e. vinyl alcohol in its different stages of polymerization, obtainable by saponification of polymerized vinyl esters, with aliphatic aldehydes in the presence of an acid reacting substance as a catalyst. The reaction proceeds even at ordinary temperatures but is preferably accelerated by heating. When the reaction is carried out at a pressure above atmospheric pressure while heating, only very small quantities of the catalyst may be added. In any case products are obtained which are superior to those obtainable without the said catalysts or at atmospheric pressure, the products according to the present invention being soluble in organic solvents and being not, or inconsiderably, swollen by water.

As catalysts which are especially suitable for the condensation may be mentioned for example mineral acids and acid reacting salts such as aluminium chloride, zinc chloride, sodium bisulphate and the like, the latter preferably being employed with the simultaneous presence of acids. Saturated as well as unsaturated aldehydes may be employed for the condensation. The aldehydes may be also employed in the form of their polymers, such as trioxymethylene, metaldehyde and the like, or derivatives which split off aldehydes under the reaction conditions may be employed, for example acetals such as methylal.

Depending on the initial materials employed the artificial masses obtained are rubber-like, plastic and elastic or hard and brittle. The properties may be modified within wide limits by the addition of softening agents as for example paraffin wax, linseed oil, a phthalic acid ester and the like. Moreover the products may be combined with other masses such as natural or synthetic rubber, celluloid or other cellulose esters or ethers and the like. In many cases, especially with the product obtained with the aid of unsaturated aldehydes such as acrolein or croton aldehyde, an improvement in the properties may be effected, by a subsequent heat treatment in the presence of sulphur or other sulphurizing agents such as sulphur chlorides. Heating for a long period of time, however, is often sufficient for this purpose.

The following examples will further illustrate the nature of this invention but the invention is not restricted to these examples. The parts are by weight.

*Example 1*

100 parts of polymerized vinyl alcohol dissolved in 3000 parts of water are heated while stirring under a reflux condenser with 125 parts of a 30 per cent aqueous solution of formaldehyde, about 10 parts of concentrated hydrochloric acid being gradually added. A white tenacious mass separates out very quickly. The excess of formaldehyde and the acid are distilled off with steam. The reaction product is washed on hot rollers until it is neutral and is then rolled until dry. It forms a hard mass which is insoluble in water and organic solvents.

A dark-coloured artificial mass which possesses the properties of hard rubber is obtained therefrom by incorporating the product with from 2 to 10 per cent its weight of sulphur by rolling between rollers heated to about 150° centigrade and then heating the mass in accordance with any of the usual methods applied in the vulcanization of India rubber.

*Example 2*

55 parts of acetaldehyde and 20 parts of concentrated hydrochloric acids are added to 100 parts of polymerized vinyl alcohol, dissolved in 3000 parts of water and the whole is heated while stirring. After some time a white rubber-like mass separates out while the whole becomes heated. The product is worked up as described in Example 1.

*Example 3*

20 parts of concentrated hydrochloric acid and 80 parts of crotonaldehyde are added to 100 parts of polymerized vinyl alcohol, dissolved in 4000 parts of water, and the mixture is heated while stirring. A pale, spongy, tenacious mass soon separates out and is further worked up as described in Example 1.

*Example 4*

100 parts of polymerized vinyl alcohol are slowly introduced into a solution from 1000 parts of 60 per cent aqueous sulphuric acid and 1000 parts of an aqueous 30 per cent solution of formaldehyde while externally cooling with ice whereupon the mixture is stirred for about 10 hours while continuously cooling with ice. The viscous solution obtained is then slowly poured into ice water, whereby the condensation product is precipitated in fine, white, fibrous flakes. The product is then washed with water until it is free from traces of formaldehyde and sulphuric acid and is then dried. It is soluble in methylene chloride and chloroform.

*Example 5*

100 parts of polymerized vinyl alcohol are dissolved in 750 parts of aqueous 70 per cent sulphuric acid whereupon 100 parts of trioxymethylene are added. The viscous solution obtained is then stirred for 6 hours at from 10° to 20° centigrade and then slowly poured into ice water. The condensation product is precipitated and worked up as described in Example 4. In contrast to the products of the condensation while warming it is soluble in methylene chloride and in chloroform. This product as well as that obtainable according to Example 4 can be worked into transparent masses similarly as acetylcellulose, or into valuable films or threads like artificial silk.

*Example 6*

100 parts of polymerized vinyl alcohol are gradually introduced into a solution cooled with ice of 1000 parts of aqueous 60 per cent sulphuric acid and 300 parts of glyoxyl sulphate, an ether-like product from glyoxal and sulphuric acid. The mixture is then stirred for 8 hours at a temperature gradually rising to 25° centigrade. On pouring the product into water the condensation product is precipitated and can be worked up in the same manner as described in Examples 4 and 5.

What we claim is:—

1. The process for the production of artificial masses which comprises acting with an aliphatic aldehyde on a polymerized vinyl alcohol, while cooling, in the presence of between about 7.5 and about 10 times the weight of said polymerized vinyl alcohol of aqueous sulfuric acid of between about 60 and about 70 per cent strength.

2. The process for the production of artificial masses which comprises acting with an aliphatic aldehyde selected from the class consisting of formaldehyde and polymers thereof on a polymerized vinyl alcohol, while cooling, in the presence of between about 7.5 and about 10 times the weight of said polymerized vinyl alcohol of aqueous sulfuric acid of between about 60 and about 70 per cent strength.

3. The process for the production of artificial masses which comprises acting with an aliphatic aldehyde selected from the class consisting of formaldehyde and polymers thereof on a polymerized vinyl alcohol at between 10° and 20° C. in the presence of between about 7.5 and about 10 times the weight of said polymerized vinyl alcohol of aqueous sulfuric acid of between about 60 and about 70 per cent strength.

4. The process for the production of artificial masses which comprises acting with an aliphatic aldehyde selected from the class consisting of formaldehyde and polymers thereof on a polymerized vinyl alcohol at between 10° and 20° C. in the presence of between about 7.5 and about 10 times the weight of said polymerized vinyl alcohol of aqueous sulfuric acid of between about 60 and about 70 per cent strength, the viscous solution obtained being slowly poured into ice-water.

5. Artificial masses comprising a condensation product of a polymerized vinyl alcohol and an aliphatic aldehyde, said masses being soluble in liquid, halogenated, aliphatic hydrocarbons and being obtainable by the process set forth in claim 1.

6. Artificial masses comprising a condensation product of a polymerized vinyl alcohol and an aliphatic aldehyde selected from the class consisting of formaldehyde and polymers thereof, said masses being soluble in liquid, halogenated, aliphatic hydrocarbons and being obtainable by the process set forth in claim 2.

HEINRICH HOPFF.
ERICH KUEHN.